United States Patent
Ohara et al.

(10) Patent No.: US 10,970,579 B2
(45) Date of Patent: Apr. 6, 2021

(54) IMAGE PROCESSING APPARATUS FOR PLACING A CHARACTER RECOGNITION TARGET REGION AT A POSITION OF A PREDETERMINED REGION IN AN IMAGE CONFORMING TO A PREDETERMINED FORMAT

(71) Applicant: PFU LIMITED, Kahoku (JP)

(72) Inventors: Keiji Ohara, Kahoku (JP); Tomoaki Wada, Kahoku (JP)

(73) Assignee: PFU LIMITED, Kahoku (JP)

( * ) Notice: Subject to any disclaimer, the term of this patent is extended or adjusted under 35 U.S.C. 154(b) by 93 days.

(21) Appl. No.: 16/424,282

(22) Filed: May 28, 2019

(65) Prior Publication Data

US 2020/0167588 A1 May 28, 2020

(30) Foreign Application Priority Data

Nov. 22, 2018 (JP) .............................. JP2018-219424

(51) Int. Cl.
*G06K 9/32* (2006.01)
*G06K 9/00* (2006.01)
*G06K 9/46* (2006.01)

(52) U.S. Cl.
CPC ....... *G06K 9/3275* (2013.01); *G06K 9/00463* (2013.01); *G06K 9/3233* (2013.01); *G06K 9/4652* (2013.01); *G06K 2209/01* (2013.01)

(58) Field of Classification Search
CPC ............... G06K 9/3275; G06K 9/3233; G06K 9/00463; G06K 9/4652; G06K 2209/01; G06K 9/50
See application file for complete search history.

(56) References Cited

U.S. PATENT DOCUMENTS 9,531,897 B2 * 12/2016 Yu ....................... H04N 1/00718
2008/0240582 A1 10/2008 Nakamura
(Continued)

FOREIGN PATENT DOCUMENTS

JP 2008-40598 A 2/2008
JP 2008040598 A * 2/2008
(Continued)

OTHER PUBLICATIONS

Vehicle License Plate Tilt Correction Based on the Straight Line Fitting Method and Minimizing Variance of Coordinates of Projection Points (Year: 2010).*
(Continued)

*Primary Examiner* — Nizar N Sivji
(74) *Attorney, Agent, or Firm* — Lewis Roca Rothgerber Christie LLP

(57) ABSTRACT

An image processing apparatus includes a storage device for storing a position of a predetermined region in an image conforming to a predetermined format, a processor for acquiring an input image including a character recognition target region, cutting out a region corresponding to the character recognition target region from the input image or an image generated from the input image to generate a corrected image in which the region is placed at the position of the predetermined region in the image conforming to the predetermined format, and detecting a character from the corrected image, and an output device for outputting information related to the detected character.

6 Claims, 12 Drawing Sheets

(56) References Cited

U.S. PATENT DOCUMENTS

| | | | |
|---|---|---|---|
| 2014/0270400 A1* | 9/2014 | Natale | G06Q 50/14 382/115 |
| 2015/0009542 A1* | 1/2015 | Zhao | G06K 9/00469 358/462 |
| 2015/0023593 A1* | 1/2015 | Fujieda | G06K 9/00442 382/165 |
| 2015/0077817 A1 | 3/2015 | Shimazaki et al. | |
| 2017/0366705 A1 | 12/2017 | Wada | |

FOREIGN PATENT DOCUMENTS

| | | | |
|---|---|---|---|
| JP | 2008-250754 A | 10/2008 |
| JP | 2009-69951 A | 4/2009 |
| JP | 2015-60448 A | 3/2015 |
| JP | 6200040 B1 | 9/2017 |

OTHER PUBLICATIONS

Digit Classification on Signboards for Telephone Number Recognition (Year: 2003).*
License plate recognition based on SIFT feature (Year: 2015).*
A System to Localize and Recognize Texts in Oriented ID card Images (Year: 2018).*

* cited by examiner

IMAGE PROCESSING APPARATUS FOR PLACING A CHARACTER RECOGNITION TARGET REGION AT A POSITION OF A PREDETERMINED REGION IN AN IMAGE CONFORMING TO A PREDETERMINED FORMAT

CROSS-REFERENCE TO RELATED APPLICATIONS

This application is based upon and claims the benefit of priority of prior Japanese Patent Application No. 2018-219424, filed on Nov. 22, 2018, the entire contents of which are incorporated herein by reference.

TECHNICAL FIELD

Embodiments discussed in the present specification relate to image processing.

BACKGROUND

In recent years, to manage information related to a traveler from a foreign country, a technique is used in which necessary information is extracted using OCR (Optical Character Recognition) technology from an input image obtained by reading a passport using a scanner. Generally, an image processing apparatus such as a scanner or a personal computer connected to a scanner recognizes characters included in an MRZ (Machine Readable Zone) of an input image obtained by reading a passport. However, depending on, e.g., the type of the passport or the scanner reading method, characters included in an MRZ may not be correctly recognized within an input image obtained by reading the passport.

A character recognition device which recognizes characters put in a character box of an accounting document having the character box printed in a drop-out color has been disclosed (see Japanese Unexamined Patent Publication (Kokai) No. 2009-69951). The character recognition device recognizes a character box from an image of a non-drop-out color, determines a character cut reference position, based on the recognized character box, cuts out a character image from a drop-out image, based on the character cut reference position, and recognizes characters.

An image input device which acquires text data from an image input from a scanner has further been disclosed (see Japanese Unexamined Patent Publication (Kokai) No. 2008-40598). The image input device performs the first OCR processing on a partial region image cut out in accordance with OCR region setting registered in advance, performs the second OCR processing upon extension of a partial region, and acquires text data, based on the two OCR results.

A character string recognition device which detects the separation positions of characters by calculating a horizontal projection of image data in the direction of a character string and a vertical projection of the image data in the vertical direction has further been disclosed (see Japanese Unexamined Patent Publication (Kokai) No. 2008-250754).

SUMMARY

In the image processing apparatus, it is desired to more accurately detect characters from an input image.

It is an object of the image processing apparatus, the control method, and the control program to allow more accurate detection of characters from an input image.

According to an aspect of the apparatus, there is provided an image processing apparatus. The image processing apparatus includes a storage device for storing a position of a predetermined region in an image conforming to a predetermined format, a processor for acquiring an input image including a character recognition target region, cutting out a region corresponding to the character recognition target region from the input image or an image generated from the input image to generate a corrected image in which the region is placed at the position of the predetermined region in the image conforming to the predetermined format, and detecting a character from the corrected image, and an output device for outputting information related to the detected character.

According to an aspect of the method, there is provided a control method for an image processing apparatus including a storage device and an output device. The method includes storing, in the storage device, a position of a predetermined region in an image conforming to a predetermined format, acquiring an input image including a character recognition target region, cutting out a region corresponding to the character recognition target region from the input image or an image generated from the input image to generate a corrected image in which the region is placed at the position of the predetermined region in the image conforming to the predetermined format, detecting a character from the corrected image, and outputting information related to the detected character from the output device.

According to an aspect of the computer-readable, non-transitory medium storing a computer program, the computer program causes an image processing apparatus including a storage device and an output device, to execute a process. The process includes storing, in the storage device, a position of a predetermined region in an image conforming to a predetermined format, acquiring an input image including a character recognition target region, cutting out a region corresponding to the character recognition target region from the input image or an image generated from the input image to generate a corrected image in which the region is placed at the position of the predetermined region in the image conforming to the predetermined format, detecting a character from the corrected image, and outputting information related to the detected character from the output device.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

DESCRIPTION OF EMBODIMENTS

Hereinafter, an image processing apparatus, a control method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
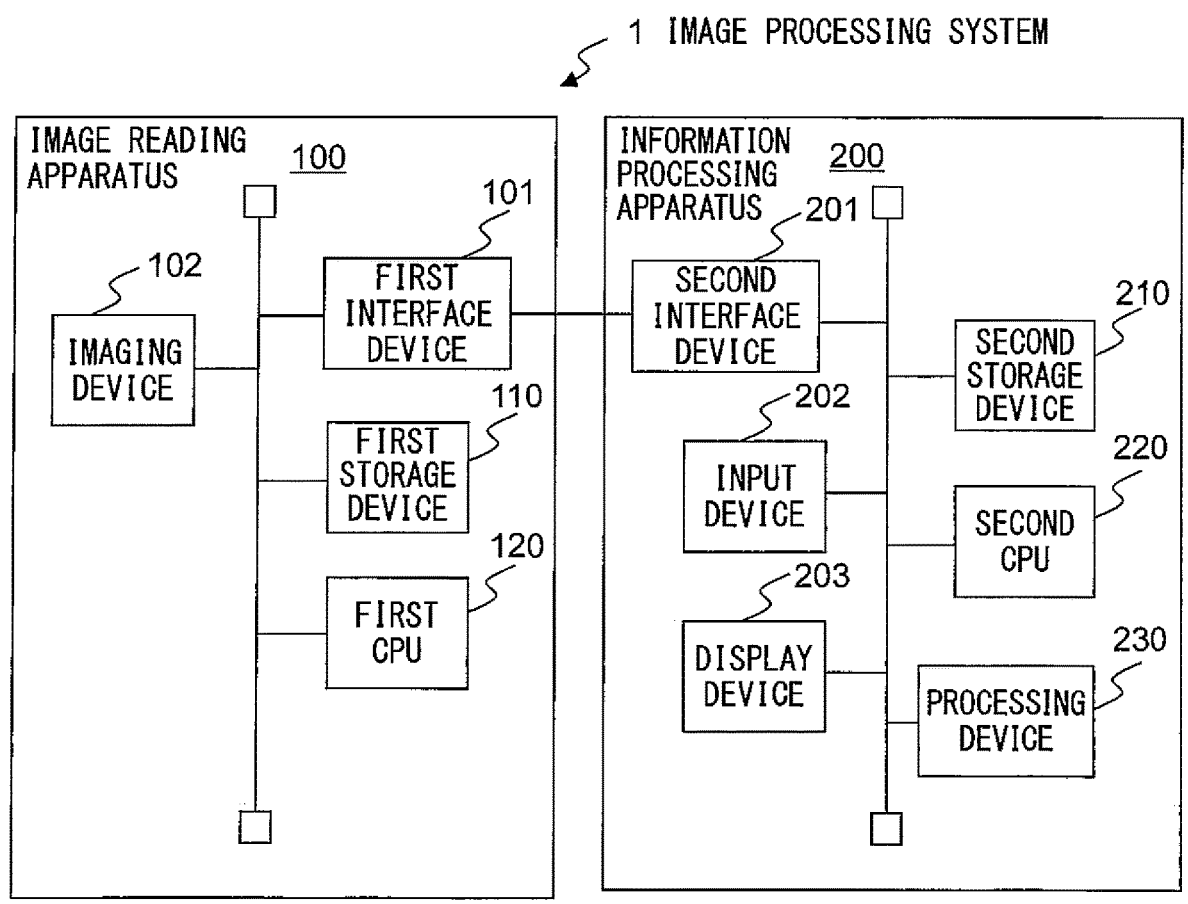
FIG. 1 is a block diagram illustrating the schematic configuration of an image processing system 1 according to an embodiment.

FIG. 1 is a diagram illustrating an image processing system according to an embodiment. An image processing system 1 includes an image reading apparatus 100 and an information processing apparatus 200, as depicted as FIG. 1.

The image reading apparatus 100 is implemented as, e.g., a scanner. The image reading apparatus 100 is implemented as a flatbed scanner. The image reading apparatus 100 may be implemented as an ADF (Auto Document Feeder) scanner which transports a document and captures an image of the document. The image reading apparatus 100 is connected to the information processing apparatus 200. The information processing apparatus 200 is an example of an image processing apparatus, such as a personal computer. The image processing system 1 may be implemented as, e.g., a kiosk terminal integrally equipped with a scanner and a personal computer.

The image reading apparatus 100 includes a first interface device 101, an imaging device 102, a first storage device 110, and a first CPU (Control Processing Unit) 120.

The first interface device 101 includes an interface circuit compatible with a serial bus such as USB (Universal Serial Bus) and is electrically connected to the information processing apparatus 20 to transmit and receive image data and various kinds of information. Instead of the first interface device 101, a communication device having an antenna for transmitting and receiving a wireless signal and a wireless communication interface circuit for transmitting and receiving a signal via a wireless communication circuit in accordance with a predetermined communication protocol may be used. The predetermined communication protocol may be, for example, a wireless LAN (Local Area Network).

The imaging device 102 includes a reduction optical system image sensor including image sensing elements implemented as CCDs (Charge Coupled Devices) linearly arrayed in the main scanning direction. The imaging device 102 further includes a light source which emits light, a lens which forms an image on the image sensing elements, and an A/D converter which amplifies and analog/digital (A/D)-converts an electrical signal output from the image sensing elements. In the imaging device 102, the image sensor captures an image of the surface of a document and generates and outputs an analog image signal, and the A/D converter A/D-converts the analog image signal and generates and outputs a digital read image. The read image is a color multilevel image having each pixel data formed by, e.g., a total of 24 bits of an R (Red) value, a G (Green) value, and a B (Blue) value represented by 8 bits for each of R, G, and B colors. A unit magnification optical system CIS (Contact Image Sensor) including image sensing elements implemented as CMOSs (Complementary Metal Oxide Semiconductors) in place of CCDs may also be used. The imaging device 102 captures a passport, etc., as a document.

The first storage device 110 includes a memory device such as a RAM (Random Access Memory), a ROM (Read Only Memory), a fixed disk device such as a hard disk or a portable storage device such as a flexible disk, an optical disc, etc. Computer programs, databases, tables etc., which are used for various kinds of processing by the image reading apparatus 10 are stored in the first storage device 110. Further, the first storage device 110 stores a computer program, a database, a table, etc., that are used for various processing of the image reading apparatus 10. The computer program may be installed on the first storage device 110 from a computer-readable, non-transitory medium such as a compact disk read only memory (CD-ROM), a digital versatile disk read only memory (DVD-ROM), etc., by using a well-known setup program, etc. The first storage device 110 further stores, e.g., a read image generated by the imaging device 102.

The first CPU 120 operates based on a program stored in the first storage 110 in advance. Alternatively, a DSP (digital signal processor), an LSI (large scale integration), etc., may be used instead of the first CPU 120. As another alternative, an ASIC (Application Specific Integrated Circuit), an FPGA (Field-Programming Gate Array), etc., may be used instead of the first CPU 120.

The first CPU 120 is connected to, e.g., the first interface device 101, the imaging device 102, and the first storage device 110 and controls each of these units. The first CPU 120 performs, e.g., document reading control of the imaging device 102 and control of data exchange with the information processing apparatus 200 via the first interface device 101.

The information processing apparatus 200 includes a second interface device 201, an input device 202, a display device 203, a second storage device 210, a second CPU 220, and a processing device 230. Each unit constituting the information processing apparatus 200 will be described in detail below.

The second interface device 201 includes an interface circuit similar to that of the first interface device 101 of the image reading apparatus 100 and interconnects the information processing apparatus 200 and the image reading apparatus 100. Instead of the second interface device 201, a communication device having an antenna for transmitting and receiving a wireless signal and a wireless communication interface circuit for transmitting and receiving a signal via a wireless communication circuit in accordance with a predetermined communication protocol such as a wireless LAN, etc., may be used.

The input device 202 includes an input device such as a keyboard, a mouse, etc., and an interface circuit acquiring signals from the input device and outputs a signal responsive to a user's operation to the second CPU 220.

The second display device 203 is an example of an output device. The second display device 203 includes a display formed by a liquid-crystal display, an organic electroluminescence display, etc., and an interface circuit which outputs image data to the display, and is connected to the second storage device 210 to display image data stored in the second storage device 210 on the display.

The second storage device 210 includes a memory device, a fixed disk device, a portable storage device, etc., that is similar to that of the first storage device 110 of the image reading apparatus 100. The second storage device 210 stores computer programs, databases, tables etc., used in various kinds of processing by the information processing apparatus 200. Further, the second storage device 210 stores a computer program, a database, a table, etc., that are used for various processing of the information processing apparatus 200. The computer program may be installed on the second storage device 210 from a computer-readable, non-transitory medium such as a CD-ROM, a DVD-ROM, etc., by using a well-known setup program, etc. The second storage device 210 further stores, e.g., the read image received from the image reading apparatus 100, and various processed images obtained by image processing on the read image by the processing device 230. The second storage device 210 further stores the position of one or a plurality of predetermined regions in an image conforming to a predetermined format. The predetermined regions will be described in detail later.

The second CPU 220 operates based on a program stored in the second storage device 210 in advance. Alternatively, a DSP, an LSI, an ASIC, an FPGA, etc., may be used instead of the second CPU 220.

The second CPU 220 is connected to, e.g., the second interface device 201, the input device 202, the display device 203, the second storage device 210, and the processing device 230 and controls each of these units. The second CPU 220 performs, e.g., control of data exchange with the image reading apparatus 100 via the second interface device 201, input control of the input device 202, display control of the display device 203, and control of image processing by the processing device 230. The second CPU 220 generates a corrected image from a read image and detects characters from the corrected image.

The processing device 230 performs predetermined image processing on the input image. The processing device 230 is implemented as, e.g., a CPU, a DSP, an LSI, an ASIC, or an FPGA.

Figure 2:
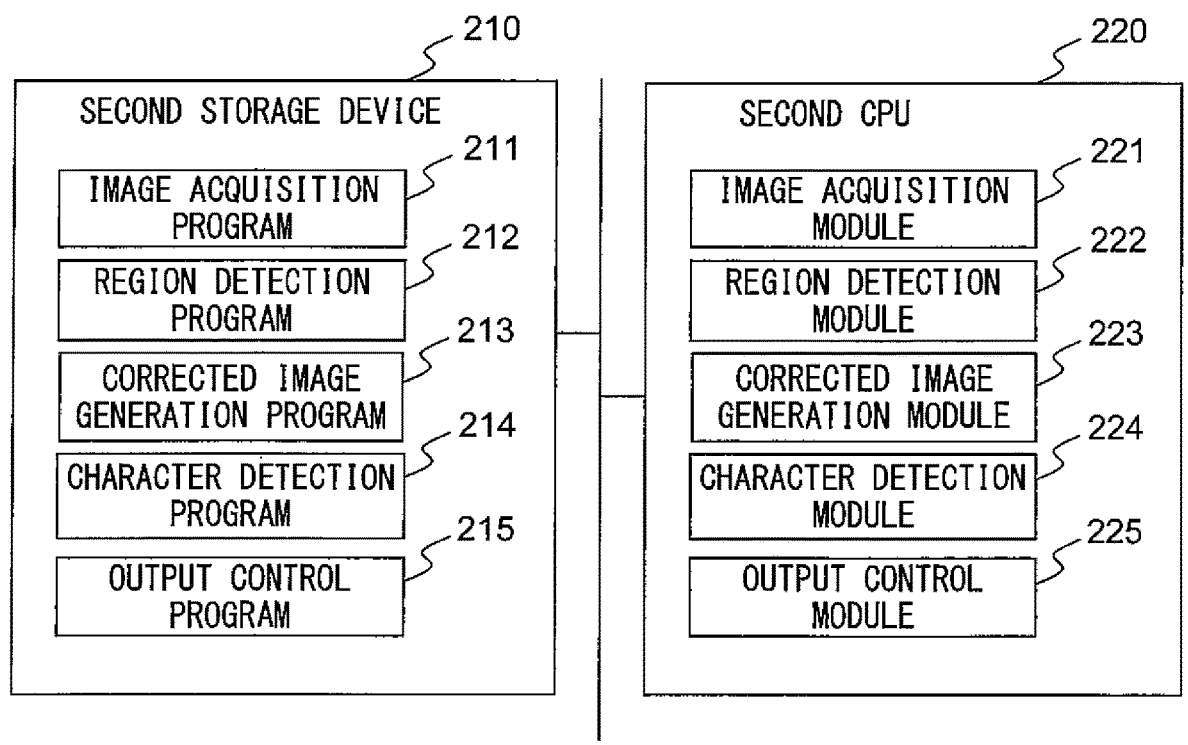
FIG. 2 is a block diagram illustrating the schematic configuration of a second storage device 210 and a second CPU 220.

FIG. 2 is a diagram illustrating the schematic configurations of the second storage device 210 and the processing device 220.

The second storage device 210 stores each program such as an image acquisition program 211, a region detection program 212, a corrected image generation program 213, a character detection program 214, and an output control program 215, as illustrated in FIG. 2. Each of these programs serves as a functional module implemented as software running on a processor. The second CPU 220 reads each program stored in the second storage device 210 and operates in accordance with each read program. Thus, the second CPU 220 functions as an image acquisition module 221, a region detection module 222, a corrected image generation module 223, a character detection module 224, and an output control module 225.

Figure 3:
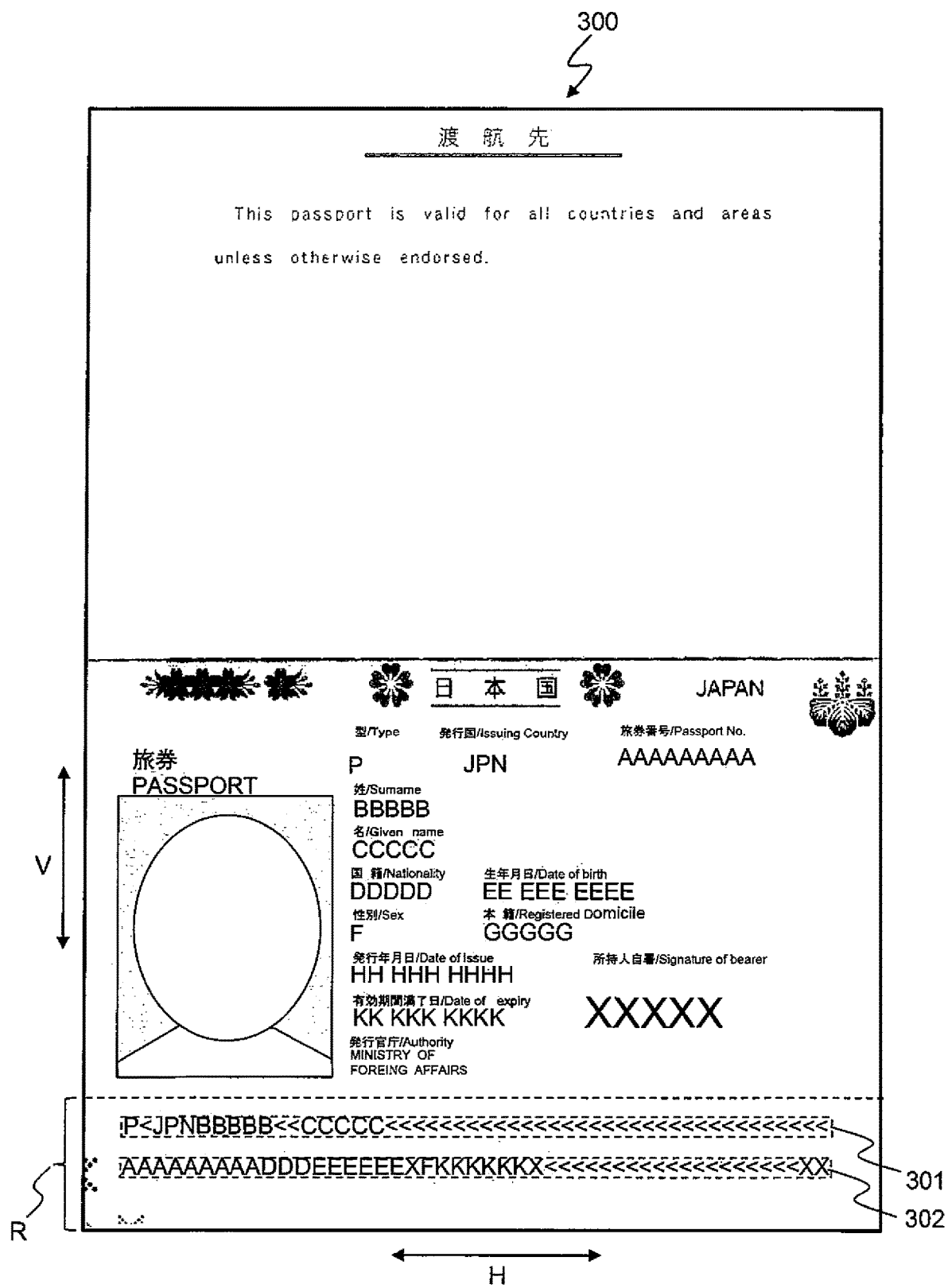
FIG. 3 is a schematic view illustrating an exemplary page of a passport.

FIG. 3 is a schematic view illustrating an exemplary page of a passport captured as a document by the imaging device 102.

A page 300 of a passport captured by the imaging device 102 includes each piece of information such as a type, an issuing country, a passport number, a full name, a nationality, a date of birth, a sex, a registered domicile, a date of issue, a date of expiry, and a photo, as illustrated in FIG. 3. The page 300 further includes, e.g., MRZs 301 and 302. The MRZs 301 and 302 are machine readable zones and represent a collection of the above-mentioned respective pieces of information.

The format of a passport, especially regarding the positions of MRZs and information represented in the MRZs, is defined by the ICAO (International Civil Aviation Organization). MRZs are placed in a region R which is adjacent to the lower end of a passport and extends in a direction (a horizontal direction H in FIG. 3) parallel to the seam of the passport. The region R is specified in the range of 23.2 mm±1.0 mm from the lower end of the passport. The region R includes an upper region corresponding to the MRZ 301 and a lower region corresponding to the MRZ 302. Each region has a maximum dimension in the horizontal direction H specified as 114.0 mm, and a maximum dimension in the vertical direction V specified as 4.3 mm. The distance from the left end of each region in the horizontal direction H to the left end of the passport, and the distance from the right end of each region to the right end of the passport are specified as 6.0 mm±1.0 mm. The distance from the central position of the lower region in the vertical direction V to the lower end of the passport is specified as 9.40 mm, and the distance from the central position of the upper region to the central position of the lower region is specified as 6.35 mm.

The second storage device 210 stores the positions of MRZs in a captured image of a passport as the positions of predetermined regions in an image conforming to a predetermined format. The format of a passport is an example of the predetermined format, and an MRZ is an example of the predetermined region. A passport of each country in principle follows the format defined by the ICAO, but the size of the passport and the position (layout), in the passport, of each piece of information including MRZs, for example, may slightly vary in each country.

Figure 4:
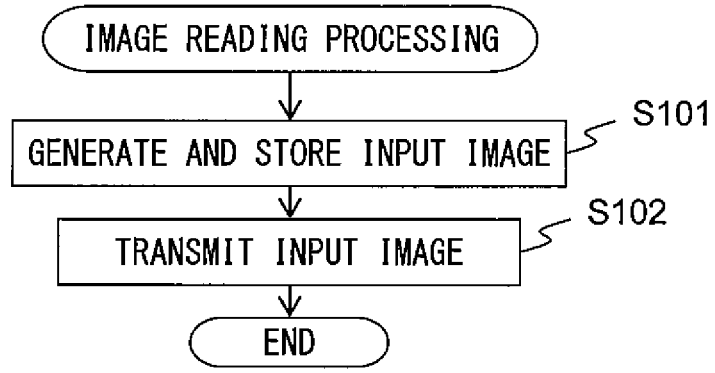
FIG. 4 is a flowchart illustrating the operation of image reading processing.

FIG. 4 is a flowchart illustrating the operation of image reading processing by the image reading apparatus 100. The operation of image reading processing will be described below with reference to the flowchart illustrated in FIG. 4. The following operation sequence is executed mainly by the first CPU 120 in cooperation with the elements of the image reading apparatus 100, based on the programs stored in the first storage device 110 in advance.

First, the imaging device 102 generates a read image obtained by capturing a document targeted for detection of characters in, e.g., a passport and stores it in the first storage device 110 (step S101).

Then, the first CPU 120 transmits the read image stored in the first storage device 110 to the information processing apparatus 200 via the first interface device 101 (step S102) and ends a series of steps.

Figure 5:
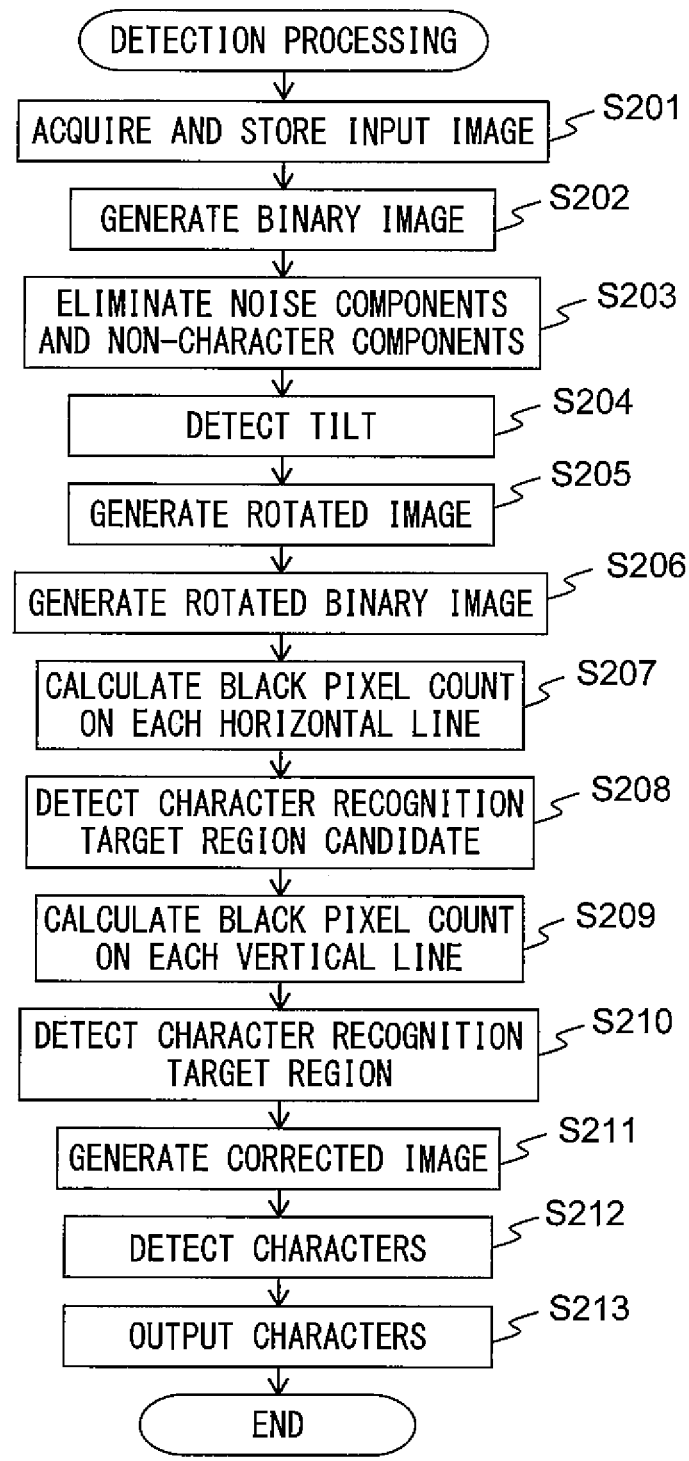
FIG. 5 is a flowchart illustrating the operation of detection processing.

FIG. 5 is a flowchart illustrating the operation of detection processing by the information processing apparatus 200. The operation of detection processing will be described below with reference to the flowchart illustrated in FIG. 5. The following operation sequence is executed mainly by the processing device 230 in cooperation with the elements of the information processing apparatus 200, based on the programs stored in the second storage device 210 in advance.

First, the image acquisition module 221 acquires a read image from the image reading apparatus 100 via the second interface device 201, generates an input image from the acquired read image, and stores it in the second storage device 210 (step S201). The read image includes one or a plurality of character recognition target regions representing characters respectively to be detected.

Figure 6:
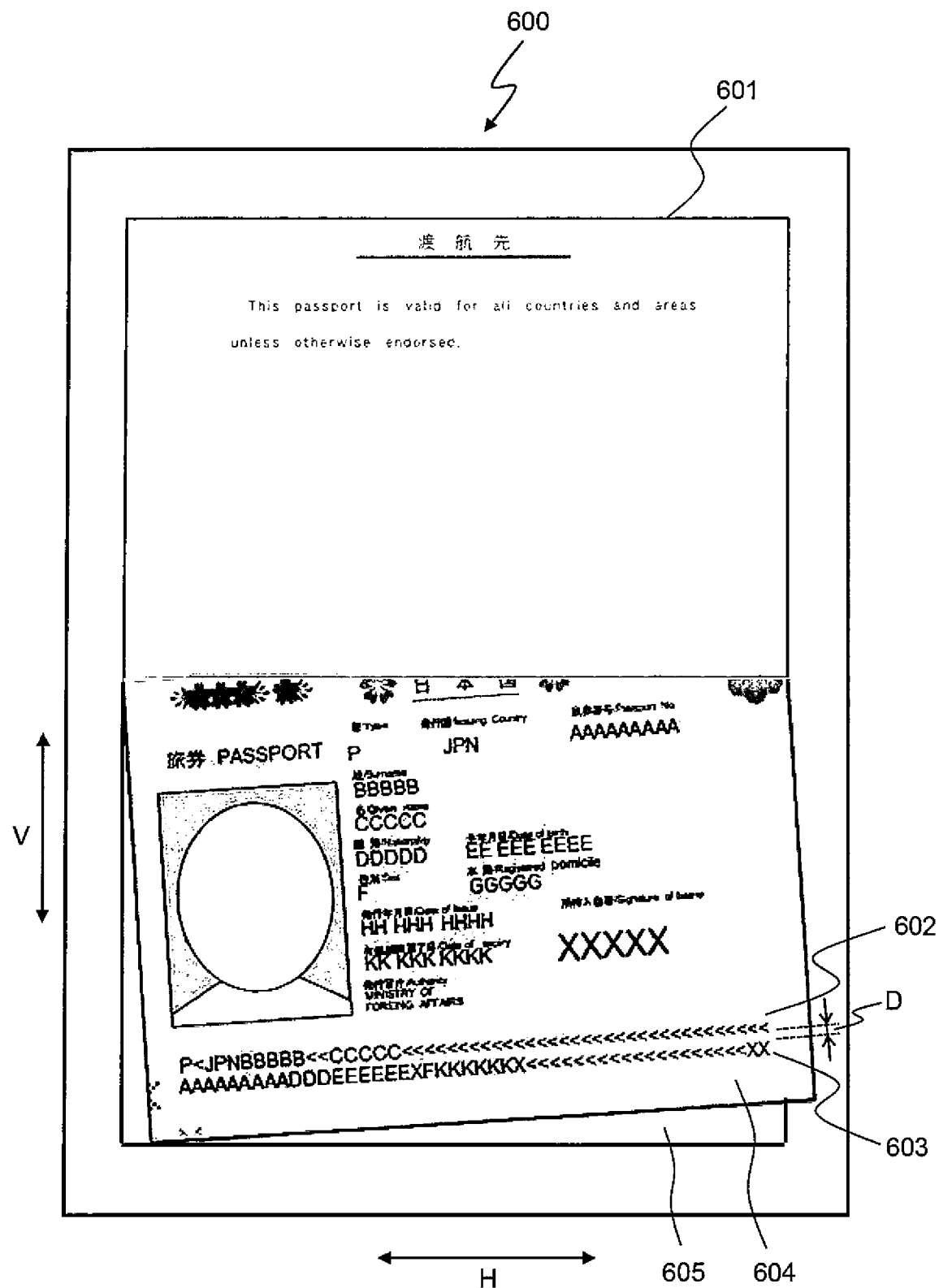
FIG. 6 is a schematic view illustrating an example of a read image 600.

FIG. 6 is a schematic view illustrating an example of a read image 600.

A passport 601 having an open page 604 containing MRZs 602 and 603 appears in the read image 600, as illustrated in FIG. 6. In this example, characters in the MRZs 602 and 603 are respectively to be detected by the information processing apparatus 200, and the MRZs 602 and 603 are respective character recognition target regions. In the read image 600, the page 604 is misaligned in the passport 601 and captured as tilted with respect to a spine 605. Therefore, the MRZs 602 and 603 are tilted with respect to the horizontal direction H in the read image 600. Further, in the read image 600, the distance D between the MRZ 602 and the MRZ 603 is small due to nonuniformity in speed at which the passport 601 is transported in the image reading apparatus 100. For such a read image 600, when an attempt is made to detect characters from the MRZs 602 and 603 by performing OCR processing, the characters may not be correctly detected.

The image acquisition module 221 extracts edge pixels from the read image for each of the horizontal direction (main scanning direction) and the vertical direction (sub-scanning direction) and generates an edge image formed by the edge pixels for each of the horizontal direction and the vertical direction. The image acquisition module 221 calculates an absolute value (to be referred to as a neighboring difference value hereinafter) of the difference in luminance value between two pixels horizontally adjacent to a given pixel in the read image, and extracts the given pixel in the read image as a vertical edge pixel when the neighboring difference value is larger than a threshold Th1. The threshold Th1 can be set to, e.g., a difference in luminance value (e.g., 20) which allows a human to visually distinguish the difference in luminance in an image. The image acquisition module 221 extracts a horizontal edge pixel by performing similar processing for the vertical direction.

The image acquisition module 221 may calculate as a neighboring difference value, an absolute value of the difference in luminance value between two pixels spaced apart from a given pixel in the read image by a predetermined distance in the horizontal or vertical direction. The image acquisition module 221 may even calculate a neighboring difference value using the color value (the R, G, or B value) of each pixel, instead of the luminance value of each pixel. The image acquisition module 221 may extract edge pixels by comparing the luminance value or the color value of the read image with a threshold. When, for example, the luminance value or the color value of a particular pixel is smaller than the threshold, and the luminance value or the color value of a pixel adjacent to the particular pixel or a pixel spaced apart from the particular pixel by a predetermined distance is equal to or larger than the threshold, the image acquisition module 221 determines the particular pixel as an edge pixel.

The image acquisition module 221 extracts straight lines from the respective edge pixels in the horizontal and vertical directions. The image acquisition module 221 detects straight lines using Hough transformation. The image acquisition module 221 may detect straight lines using the least squares method. The image acquisition module 221 may put edge pixels adjacent to each other in each edge image into one group by labeling and detect as straight lines, approximate straight lines connecting together two edge pixels placed at the two ends, in the horizontal or vertical direction, of each group.

The image acquisition module 221 detects a rectangle from the detected straight lines. The image acquisition module 221 extracts rectangle candidates formed by four straight lines: two pairs of nearly orthogonal straight lines of the detected straight lines. The image acquisition module 221 first selects one of straight lines in the horizontal direction (to be referred to as a first horizontal line hereinafter) and extracts a straight line in the horizontal direction (to be referred to as a second horizontal line hereinafter) nearly parallel to (e.g., within ±3°) the selected straight line and spaced apart from this straight line by a threshold Th2 or more. The image acquisition module 221 then extracts a straight line in the vertical direction (to be referred to as a first vertical line hereinafter) nearly perpendicular to (e.g., within ±3° with respect to 90°) the first horizontal line. The image acquisition module 221 extracts a straight line in the vertical direction (to be referred to as a second vertical line hereinafter) nearly perpendicular to the first horizontal line and spaced apart from the first vertical line by a threshold Th3 or more. The thresholds Th2 and Th3 may be set in advance in accordance with the size of a document to be read by the image reading apparatus 100 and may take equal values.

The image acquisition module 221 extracts all combinations of first horizontal lines, second horizontal lines, first vertical lines, and second vertical lines satisfying the above-mentioned conditions and, in turn, extracts a rectangle formed by each extracted combination as a rectangle candidate, for all extracted straight lines. The image acquisition module 221 detects a rectangle candidate having a largest area among the extracted rectangle candidates as a rectangle and cuts out the detected rectangle from the read image to generate a cut image.

The image acquisition module 221 calculates a luminance value as the following equation:

$$\text{Luminance Value} = 0.299 \times (R \text{ Value}) + 0.587 \times (G \text{ Value}) + 0.114 \times (B \text{ Value})$$

for each pixel in the cut image, and generates and acquires as an input image, a monochrome multilevel image having the calculated luminance value as the gradation value of a pixel corresponding to each pixel. The thus generated input image also includes a character recognition target region included in the read image. The imaging device 102 may generate a monochrome multilevel image as the read image. In this case, the image acquisition module 221 acquires the cut image as an input image.

Figure 7:
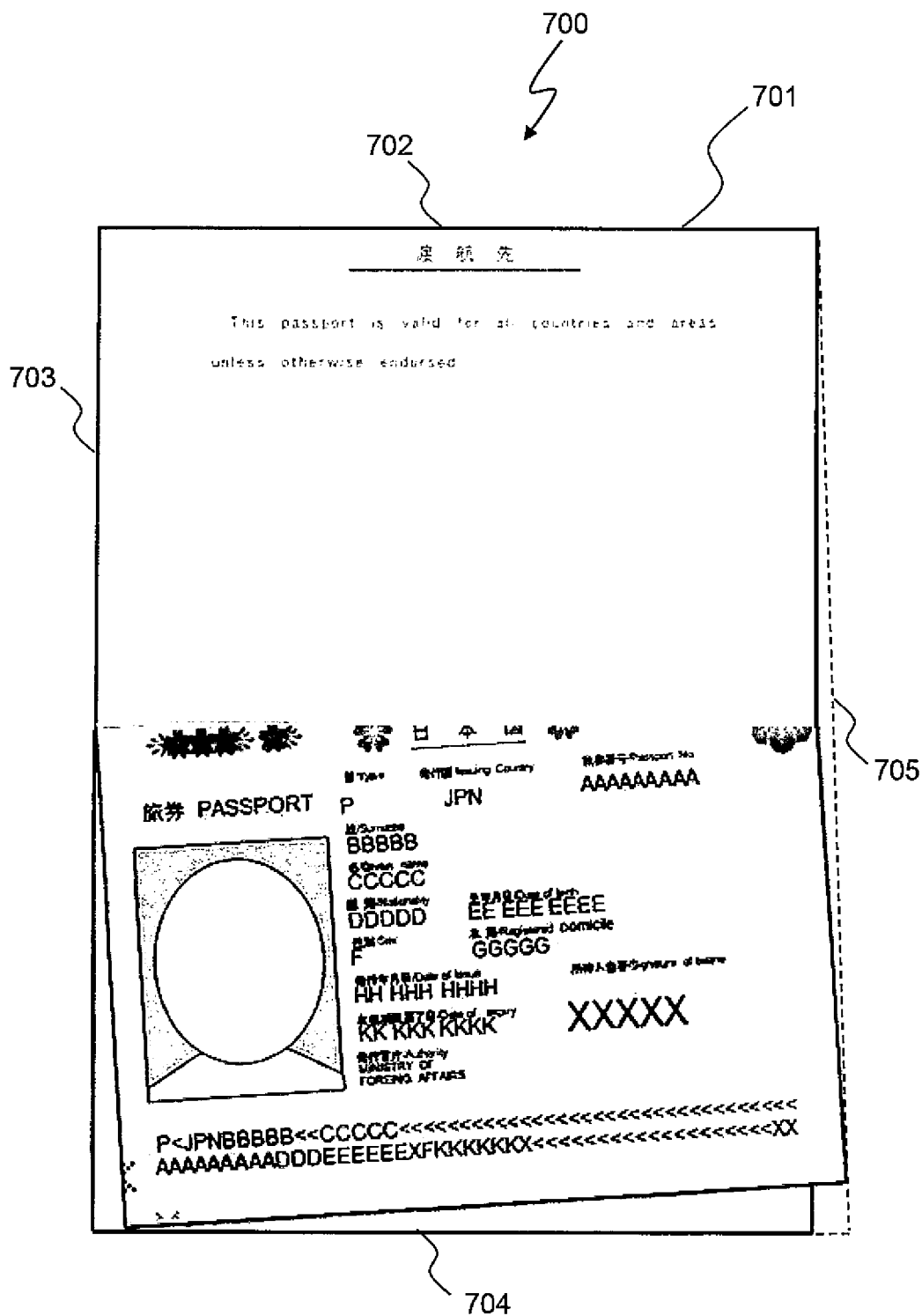
FIG. 7 is a schematic view illustrating an example of an input image 700.

FIG. 7 is a schematic view illustrating an example of an input image 700.

The input image 700 illustrated in FIG. 7 is generated from the read image 600 illustrated in FIG. 6. The input image 700 includes a rectangle 701 formed by straight lines 702, 703, and 704 corresponding to the upper, left, and lower sides of the passport 601 illustrated in FIG. 6, and an approximate straight line 705 connecting together the upper right end to the lower right end.

The region detection module 222 generates a binary image by binarizing the input image (step S202). The region detection module 222 generates as a binary image, an image formed by pixels having a gradation value equal to or larger than a binarization threshold in the input image as white pixels, and pixels having a gradation value smaller than the binarization threshold in the input image as black pixels. The binarization threshold is set to a value between the gradation values of pixels forming a general background and those of pixels forming characters, by a preliminary experiment. Thus, the binary image is formed by pixels corresponding to the characters in the input image as black pixels and pixels corresponding to the background in the input image as white pixels.

Figure 8:
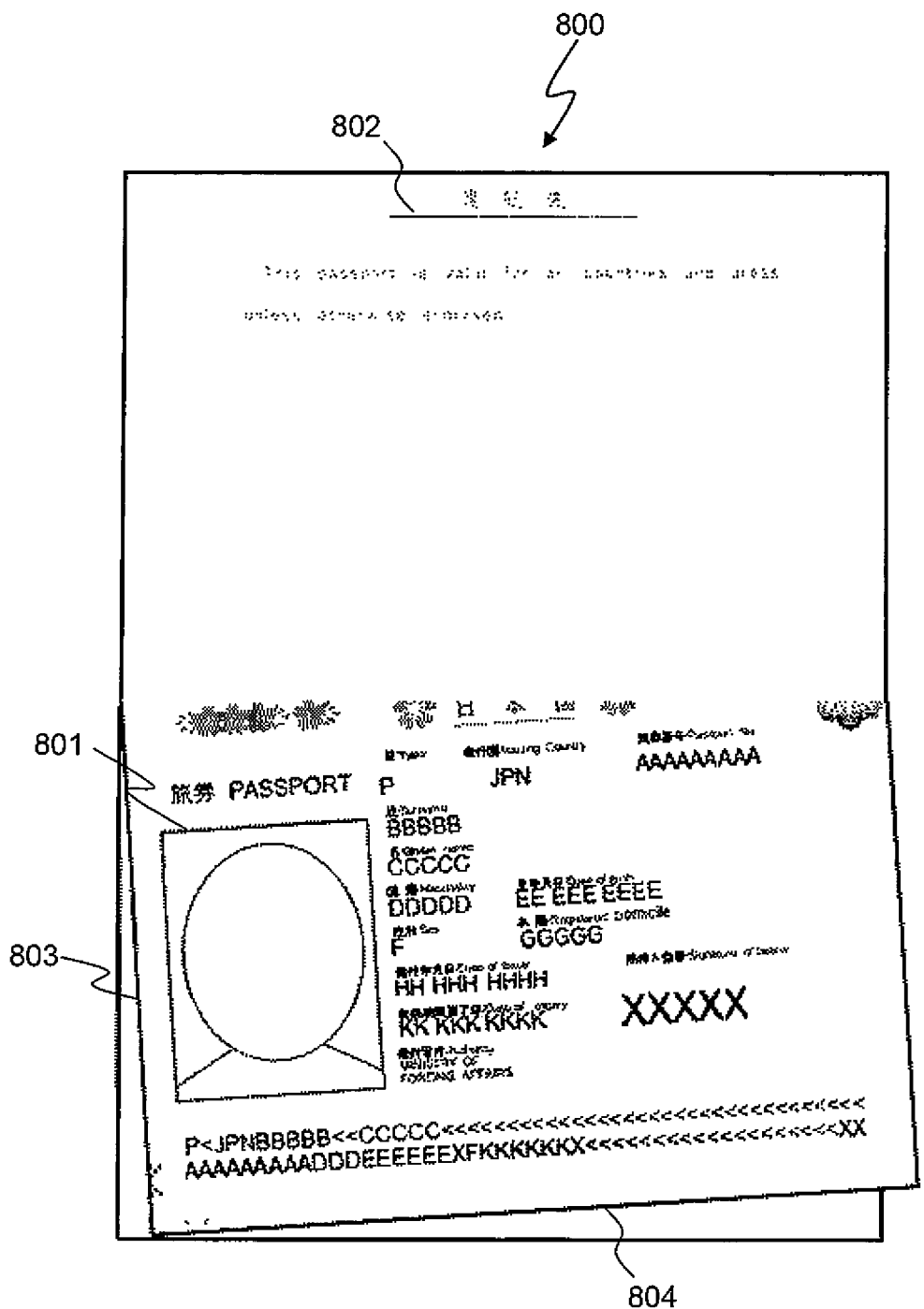
FIG. 8 is a schematic view illustrating an example of a binary image 800.

FIG. 8 is a schematic view illustrating an example of a binary image 800.

The binary image 800 illustrated in FIG. 8 is generated from the input image 700 illustrated in FIG. 7. As illustrated in FIG. 8, in the binary image 800, pixels corresponding to characters in the input image 700 illustrated in FIG. 7 are converted into black pixels, and pixels corresponding to the background in the input image 700 are converted into white pixels. However, in the binary image 800, pixels corresponding to, e.g., a photo 801, an underline 802, and outer frames 803 and 804 of the passport are also converted into black pixels.

The region detection module 222 eliminates noise components, and non-character components such as a photo, an underline, or outer frames in the binary image (step S203).

The region detection module 222 puts black pixels adjacent to each other in the binary image into one group by labeling and specifies connection regions formed by connection of the black pixels in the binary image. The region detection module 222 extracts a connection region having horizontal and vertical dimensions smaller than a character lower limit from the specified connection regions as a noise component. The region detection module 222 further extracts a connection region having a horizontal or vertical dimension equal to or larger than a character upper limit from the specified connection regions as a non-character component. The character lower limit is set to a dimension in an image corresponding to the minimum dimension, in the horizontal and vertical directions, of characters used in a document to be read, and the character upper limit is set to a dimension in the image corresponding to the maximum dimension, in the horizontal and vertical directions, of the characters used in the document to be read. The region detection module 222 converts a region extracted as a noise component and a region extracted as a non-character component (black pixels) into white pixels, in the binary image.

Figure 9:
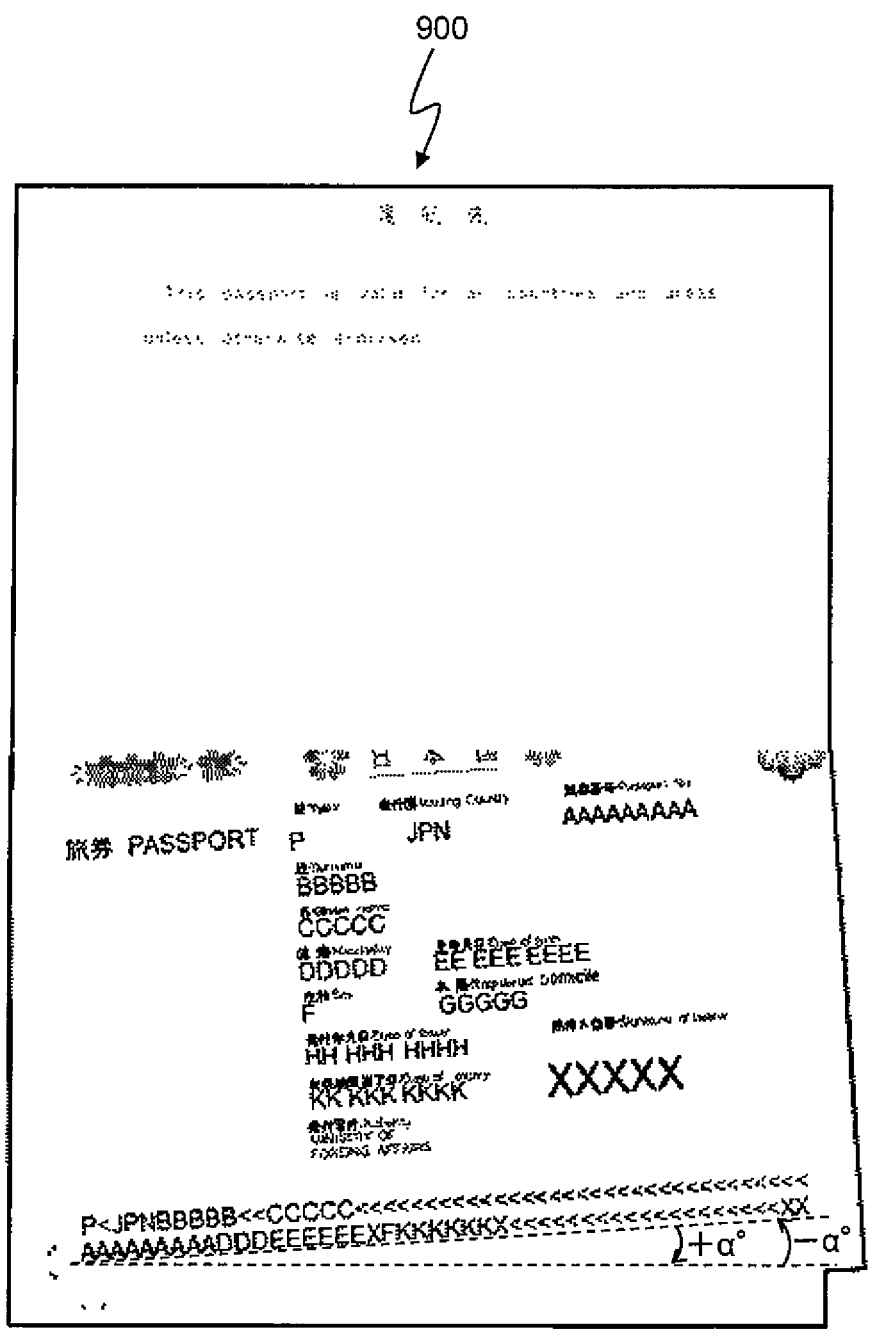
FIG. 9 is a schematic view illustrating an example of a binary image 900.

FIG. 9 is a schematic view illustrating an example of a binary image 900 obtained by eliminating noise components and non-character components.

The binary image 900 illustrated in FIG. 9 is obtained by eliminating noise components and non-character components in the binary image 800 illustrated in FIG. 8. As illustrated in FIG. 9, in the binary image 900, pixels corresponding to, e.g., the photo 801, the underline 802, and the outer frames 803 and 804 of the passport illustrated in FIG. 8 are converted into white pixels.

The region detection module 222 can more accurately detect the distribution of characters in the binary image, in processing to be described later, by eliminating noise components and non-character components from the binary image.

The region detection module 222 detects the tilt of the document included in the input image (step S204).

The region detection module 222 extracts a rectangle circumscribed about each connection region remaining without removal as a character region, in the binary image obtained by eliminating noise components and non-character components. The region detection module 222 puts character regions placed within a predetermined distance in a predetermined direction (e.g., the horizontal direction) and spaced apart from each other in a direction (e.g., the vertical direction) perpendicular to the predetermined direction into groups corresponding to character strings. The region detection module 222 calculates a sum of the areas of circumscribed rectangles in respective groups when the binary image is rotated every predetermined angle (e.g., +1° and −1°) and detects an angle obtained by inverting the sign of an angle which minimizes the calculated sum as the tilt of the document included in the input image.

In the binary image 900 illustrated in FIG. 9, since each character string is aligned along the horizontal direction when the binary image 900 is rotated through +α°, the sum of the areas of circumscribed rectangles in respective groups is minimum. Therefore, −α° obtained by inverting the sign of +α° is detected as the tilt of the document included in the input image.

The region detection module 222 may calculate a sum of the widths (widthwise dimensions) of circumscribed rectangles in respective groups when the binary image is rotated every predetermined angle, and detect an angle obtained by inverting the sign of an angle which minimizes the calculated sum as the tilt of the document included in the input image. Alternatively, the region detection module 222 detects characters using a known OCR (Optical Character Recognition) technique from circumscribed rectangles in respective groups when the binary image is rotated every predetermined angle, and calculates the certainty factor of each detected character. The certainty factor is the degree of matching between a certain image pattern and an image pattern in the binary image, for the detected characters, and is, e.g., normalized correlation. The region detection module 222 may calculate a sum of the certainty factors of respective detected characters and detect an angle obtained by inverting the sign of an angle which maximizes the calculated sum as the tilt of the document included in the input image.

The region detection module 222 generates a rotated image by rotating the input image, based on the detected tilt (step S205). The region detection module 222 generates a rotated image by rotating the input image to set the tilt of the document to zero. The region detection module 222 may perform predetermined antialiasing processing on the generated rotated image. This reduces jaggies (jagged pixel pattern) in the rotated image.

In the example illustrated in FIG. 9, the region detection module 222 generates a rotated image by rotating the input image (transforming the position of each pixel in the input image) through an angle (+α°) which minimizes the sum of the areas or the widths of circumscribed rectangles in respective groups when the binary image is rotated.

The region detection module 222 generates a rotated binary image by binarizing the rotated image (step S206). The region detection module 222 generates as a binary image, an image formed by pixels having a gradation value equal to or larger than a binarization threshold in the rotated image as white pixels, and pixels having a gradation value smaller than the binarization threshold in the rotated image as black pixels. The region detection module 222 eliminates noise components and non-character components from the rotated binary image, in the same way as in the process of step S203.

The region detection module 222 may generate a rotated binary image by rotating the binary image, based on the tilt detected in step S204, instead of the processes in steps S205 and S206. The region detection module 222 can generate a rotated binary image with less jaggies by generating a rotated binary image, based on a rotated image obtained by rotating the input image. The region detection module 222 can shorten the time of processing for generating a rotated binary image and can reduce the load of detection processing by generating a rotated binary image by rotating the binary image.

Figure 10:
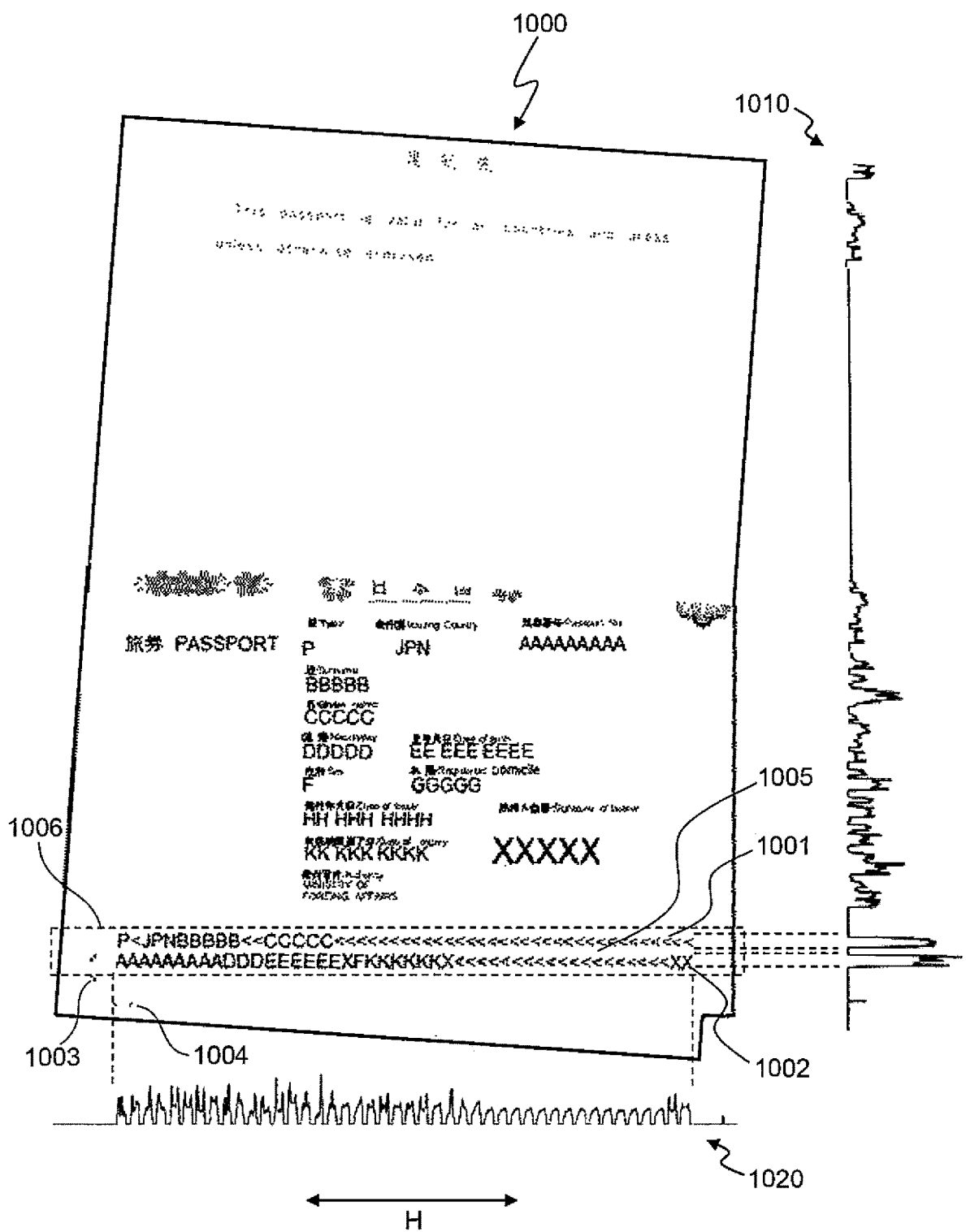
FIG. 10 is a schematic view illustrating an example of a rotated binary image 1000.

FIG. 10 is a schematic view illustrating an example of a rotated binary image 1000.

The rotated binary image 1000 illustrated in FIG. 10 is generated from the input image 700 illustrated in FIG. 7. In the rotated binary image 1000, the document is rotated with respect to the input image 700 (or the binary image 900 illustrated in FIG. 9) so that MRZs 1001 and 1002 extend in the horizontal direction H, as illustrated in FIG. 10.

The region detection module 222 calculates a black pixel count on each line extending in a predetermined direction in the rotated binary image, for each line extending in the predetermined direction. The line means a group of pixels aligned in a specific direction within the image. The region detection module 222 generates a horizontal histogram having each line (the coordinate of each line in a direction perpendicular to the predetermined direction) as its class and the black pixel count on each line as its frequency (step S207). The predetermined direction means the horizontal direction in the rotated binary image, i.e., the direction in which the document detected in the input image in step S206 is tilted.

A graph 1010 illustrated in FIG. 10 represents a horizontal histogram of the document depicted in the rotated binary image 1000. In the rotated binary image 1000, each character string is aligned along the horizontal direction H, as illustrated in FIG. 10. Therefore, a large number of characters are present and, in turn, a large number of black pixels are present on a line having characters, while no characters are present at all and, in turn, fewer number of black pixels are present on the remaining lines.

The region detection module 222 detects a character recognition target region candidate in the input image, based on the black pixel count calculated for each line extending in the predetermined direction (step S208). The region detection module 222 refers to the horizontal histogram, extracts a region corresponding to the position of the predetermined region stored in the second storage device 210 within the input image, and detects it as a character recognition target region candidate. The region detection module 222 determines that no character recognition target region is present in the input image when no character recognition target region candidate is detected.

When, for example, the predetermined region is an MRZ, the region detection module 222 extracts a group having vertically continuous horizontal lines extending in the horizontal direction. The region detection module 222 scans the horizontal histogram sequentially from the lower end of the rotated binary image and extracts a group having at least a first predetermined number of continuous horizontal lines on which the ratio of the black pixel count to the total pixel count in each horizontal line is equal to or higher than a predetermined ratio. The predetermined ratio is set to the minimum value of the ratio of the black pixel count to the total pixel count in each horizontal line including an MRZ, by a preliminary experiment. The first predetermined number is set to a pixel count corresponding to the minimum vertical dimension (e.g., 2 mm) of the upper and lower regions of the MRZs, by a preliminary experiment.

The region detection module 222 detects as character recognition target region candidates, regions in the input image corresponding to regions within a predetermined distance from the central positions, in the vertical direction, of respective groups extracted first and second from the lower end of the rotated binary image. The predetermined distance is set to a pixel count corresponding to a value obtained by adding a predetermined margin to ½ of the maximum vertical dimension of the upper and lower regions of the MRZs. When no two groups are extracted, the region detection module 222 determines that no character recognition target region (MRZ) is present in the input image.

The detection range of a character recognition target region candidate may be set based on the position of the predetermined region stored in the second storage device 210. For example, the lower end of the detection range is set to a position spaced apart from that corresponding to the central position of the lower region of the MRZ in the vertical direction toward the lower end of the passport by a pixel count obtained by adding a predetermined margin to a pixel count corresponding to ½ of the maximum vertical dimension of the lower region. The upper end of the detection range is set to a position spaced apart from that corresponding to the upper end of the region R including the MRZs toward the upper end of the passport by a predetermined margin. The region detection module 222 can prevent erroneous detection of a character recognition target region candidate due to factors other than the MRZs such as patterns 1003 and 1004 illustrated in FIG. 10, by limiting the detection range of a character recognition target region candidate.

The region detection module 222 calculates a black pixel count on each line extending in a direction perpendicular to a predetermined direction in the rotated binary image, for each line extending in the direction perpendicular to the predetermined direction. The region detection module 222 generates a vertical histogram having each line (the coordinate of each line in the predetermined direction) as its class and the black pixel count on each line as its frequency (step S209). The predetermined direction means the vertical direction in the rotated binary image, i.e., a direction perpendicular to that in which the document detected in the input image in step S204 is tilted.

The region detection module 222 may calculate the number of black pixels in the region detected as a character recognition target region candidate in the rotated binary image of black pixels on each line, as a black pixel count on each line. When the predetermined region is an MRZ, the region detection module 222 may calculate the number of black pixels in a region including two regions detected as character recognition target region candidates in the rotated binary image and a region sandwiched between the two regions, as a black pixel count on each line.

A graph 1020 illustrated in FIG. 10 represents a vertical histogram of the document depicted in the rotated binary image 1000. In the example illustrated in FIG. 10, a black pixel count in a region 1006 including a region corresponding to the MRZ 1001, a region corresponding to the MRZ 1002, and a region 1005 sandwiched between the region corresponding to the MRZ 1001 and the region corresponding to the MRZ 1002 is calculated. As illustrated in FIG. 10, a large number of characters are present and, in turn, a large number of black pixels are present on a vertical line having an MRZ, while no characters are present and, in turn, fewer number of black pixels are present on the remaining vertical lines.

The region detection module 222 detects a character recognition target region in the input image, based on the black pixel count calculated for each line extending in the direction perpendicular to the predetermined direction (step S210). The region detection module 222 refers to the vertical histogram, extracts a region corresponding to the position of the predetermined region stored in the second storage device 210 within the input image, and detects it as a character recognition target region.

When, for example, the predetermined region is an MRZ, the region detection module 222 scans the vertical histogram sequentially from the left end of the rotated binary image and extracts a first group having at least a second predetermined number of continuous vertical lines on which the black pixel count is equal to or larger than a predetermined pixel count. The predetermined pixel count is set to, e.g., 1. The second predetermined number is set to a pixel count corresponding to the horizontal dimension (e.g., 0.5 mm) of one character in the MRZ, by a preliminary experiment. When the predetermined region is an MRZ of a passport, since a character (P) placed at the left end of the upper region is determined, the second predetermined number may be set to a pixel count corresponding to the horizontal dimension (e.g., 1.0 mm) of the character P in the MRZ.

The region detection module 222 scans the vertical histogram sequentially from right end of the rotated binary image and extracts a second group having at least a third predetermined number of continuous vertical lines on which the black pixel count is equal to or larger than the predetermined pixel count. The third predetermined number is set to a pixel count corresponding to the horizontal dimension (e.g., 0.5 mm) of one character in the MRZ, by a preliminary experiment. In this manner, the region detection module 222 can extract each group so as not to contain noise such as isolated points by extracting a group having at least a second or third predetermined number of continuous vertical lines on which the black pixel count is equal to or larger than the predetermined pixel count.

When the distance from the left end of the first group to the right end of the second group is equal to or larger than a lower limit and equal to or smaller than an upper limit, the region detection module 222 detects as a character recognition target region, a region in the input image corresponding to a region within a predetermined distance from the central position between the left end of the first group and the right end of the second group. The lower limit is set to a pixel count obtained by subtracting a predetermined margin from a pixel count corresponding to the maximum horizontal dimension of the upper and lower regions of the MRZs, and the upper limit is set to a pixel count obtained by adding a predetermined margin to a pixel count corresponding to this maximum dimension. The predetermined distance is set to a pixel count obtained by adding a predetermined margin to a pixel count corresponding to ½ of the maximum horizontal dimension of the upper and lower regions of the MRZs.

When the distance from the left end of the first group to the right end of the second group is smaller than the lower limit, the region detection module 222 determines that no character recognition target region (MRZ) is present in the input image. When the distance from the left end of the first group to the right end of the second group is larger than the upper limit, the region detection module 222 extracts a first group or a second group again until the distance from the left end of the first group to the right end of the second group becomes equal to or larger than the lower limit and equal to or smaller than the upper limit. The region detection module 222 scans the vertical histogram again in the rightward direction from the left end of the first group and extracts as a new first group, a group having at least a second predetermined number of vertical lines which are continuous across a vertical line having zero black pixel count and on which the black pixel count is equal to or larger than the predetermined pixel count. Alternatively, the region detection module 222 scans the vertical histogram again in the leftward direction from the right end of the second group and extracts as a new second group, a group having at least a third predetermined number of vertical lines which are continuous across a vertical line having zero black pixel count and on which the black pixel count is equal to or larger than the predetermined pixel count.

The extraction range of a first group and a second group may be set based on the position of the predetermined region stored in the second storage device 210. For example, the left end of the extraction range is set to a position spaced apart from that corresponding to the left end of the MRZ in the horizontal direction toward the left end of the image by a predetermined margin. The right end of the detection range is set to a position spaced apart from that corresponding to the right end of the MRZ in the horizontal direction toward the right end of the image by a predetermined margin. The region detection module 222 can prevent erroneous detection of a character recognition target region due to factors other than the MRZs such as the patterns 1003 and 1004 illustrated in FIG. 10, by limiting the extraction range of a first group and a second group.

In this manner, the region detection module 222 detects a character recognition target region, based on a rotated image obtained by rotating an input image, based on the tilt of a document included in the input image. Thus, the region detection module 222 can satisfactorily detect a character recognition target region even when the character recognition target region is tilted in the input image.

As described above, a passport of each country in principle follows the format defined by the ICAO, but the size of the passport and the position, in the passport, of each piece of information including MRZs, for example, may slightly vary in each country. The region detection module 222 can accurately detect a character recognition target region for passports of various countries by detecting a character recognition target region, based on the variance of black pixel counts in the rotated binary image.

In particular, depending on the type of the passport, it is often the case that the passport has a spine larger than a page containing MRZs, and the spine appearing around the page containing the MRZs is included in the input image. In a passport of a country which is not compliant with the standard stipulated by the ICAO, no MRZs may be originally put at specified positions. It is also often the case that a document backing having a color different from the background color of a document is included in the input image due to failure of cropping processing for some reason. In these cases, no character recognition target region may be present at an expected position in the input image. The region detection module 222 can satisfactorily detect a character recognition target region, even when no character recognition target region is present at an expected position in the input image, by detecting a character recognition target region, based on the variance of black pixel counts in the rotated binary image.

The region detection module 222 detects a character recognition target region candidate and a character recognition target region with a predetermined margin with respect to the position stored in the second storage device 210. Thus, the region detection module 222 can satisfactorily detect the entire character recognition target region even when characters are partially eliminated by, e.g., binarization processing or noise elimination processing.

When a character recognition target region is detected in the input image, the corrected image generation module 223 cuts out a region corresponding to the character recognition target region from the rotated binary image and generates a corrected image in which the cut region is placed at the position of a predetermined region in an image conforming to a predetermined format (step S211). The rotated binary image is an example of an image generated from the input image. In the rotated binary image, the corrected image generation module 223 generates a corrected image by specifying a region corresponding to a character recognition target region in the input image and placing the specified region at the position of the predetermined region in the image conforming to the predetermined format, stored in the second storage device 210.

When the size of the character recognition target region is different from that of the predetermined region, the corrected image generation module 223 enlarges or reduces the character recognition target region to place the character recognition target region at the position of the predetermined region in the corrected image. In enlarging the character recognition target region, the corrected image generation module 223 does so by extending the character recognition target region using known interpolation processing such as linear interpolation. The corrected image generation module 223 may enlarge the character recognition target region by extending it using other types of interpolation processing such as the nearest neighbor method and the bilinear method. In reducing the character recognition target region, the corrected image generation module 223 does so by thinning out the character recognition target region. The corrected image generation module 223 can place a character recognition target region in an appropriate mode within the corrected image by enlarging or reducing the character recognition target region.

Figure 11:
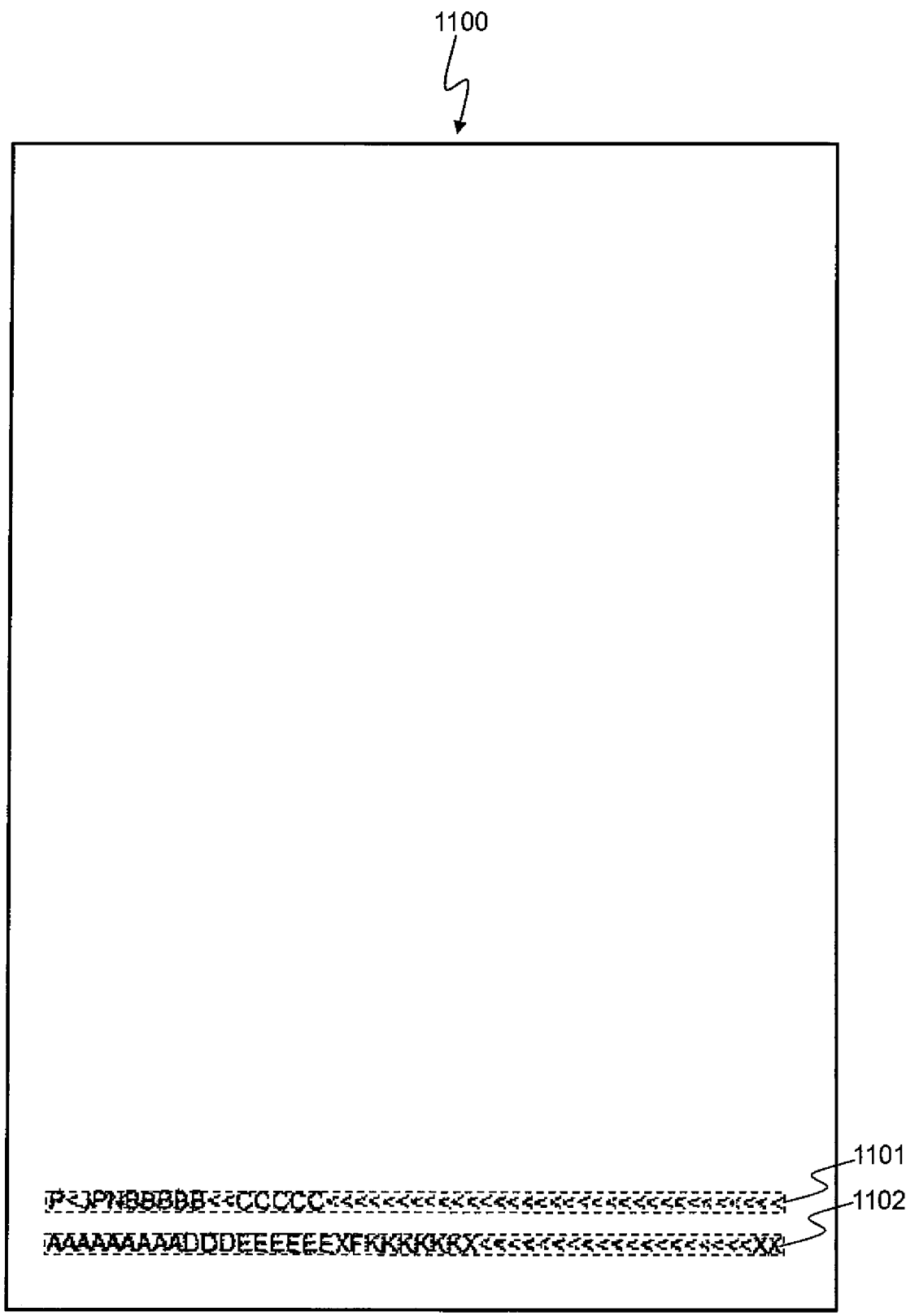
FIG. 11 is a schematic view illustrating an example of a corrected image 1100.

FIG. 11 is a schematic view illustrating an example of a corrected image 1100.

The corrected image 1100 illustrated in FIG. 11 is generated from the rotated binary image 1000 illustrated in FIG. 10. In the corrected image 1100, character recognition target regions 1101 and 1102 corresponding to MRZs are placed at positions (regions) specified for the MRZs, while other contents are not placed at all, as illustrated in FIG. 11.

The character detection module 224 detects characters from the corrected image (step S212). The character detection module 224 detects characters from the corrected image using a known OCR technique. When no character recognition target region is detected in the input image, the character detection module 224 detects characters from the rotated binary image. Alternatively, in this case, the character detection module 224 may detect characters from the binary image.

As described above, in the corrected image, character recognition target regions corresponding to MRZs are placed at appropriate positions specified for the MRZs. This prevents erroneous detection of characters due to too close characters in the MRZs. In the corrected image, contents other than character recognition target regions corresponding to MRZs are not placed at all. This prevents erroneous detection of characters in the MRZs due to the influence of contents other than the MRZs.

The output control module 225 displays the detected characters on the display device 203 (step S213) and ends a series of steps. The output control module 225 may display the corrected image on the display device 203, instead of or in addition to the detected characters, as information related to the detected characters. The output control module 225 may transmit the detected characters or the corrected image to, e.g., a server (not illustrated) via a communication device (not illustrated). In this manner, the output control module 225 outputs information related to the detected characters.

In step S211, the corrected image generation module 223 may cut out a character recognition target region from the input image to generate a corrected image including the character recognition target region placed at the position of the predetermined region. In this case, the corrected image generation module 223 places the character recognition target region at the position of the predetermined region by rotating it based on the tilt detected in step S204. In step S212, the character detection module 224 detects characters from the multilevel, corrected image. The corrected image generation module 223 may binarize the corrected image having the character recognition target region cut out from the input image, and the character detection module 224 may detect characters from the binary, corrected image.

Upon omission of step S203, the region detection module 222 may detect a character recognition target region without eliminating noise components and non-character components in the binary image. Upon omission of steps S204 to S206, the region detection module 222 may detect a character recognition target region from the binary image.

In step S204, the region detection module 222 may detect the tilt of the document not from the binary image but from an edge image. In this case, the region detection module 222 generates an edge image formed by edge pixels by extracting the edge pixels from the input image. The region detection module 222 puts edge pixels adjacent to each other in the edge image into one group by labeling and specifies a region having connected edge pixels in the edge image as a connection region. The region detection module 222 detects the tilt of the document from the connection region in the edge image, as in the case where the tilt of the document is detected from the connection region in the binary image.

Similarly, in steps S207 to S210, the region detection module 222 may detect a character recognition target region not from the binary image but from the edge image. In this case, the region detection module 222 calculates an edge pixel count on each line extending in a predetermined direction in the edge image, for each line extending in the predetermined direction, and generates a horizontal histogram having each line as its class and the black pixel count on each line as its frequency. The region detection module 222 calculates an edge pixel count on each line extending in a direction perpendicular to the predetermined direction in the edge image, for each line extending in the direction perpendicular to the predetermined direction, and generates a vertical histogram having each line as its class and the black pixel count on each line as its frequency.

In steps S207 to S210, the region detection module 222 may detect a character recognition target region using other methods, instead of detecting a character recognition target region, based on the black pixel count on each line. For example, the region detection module 222 puts black pixels adjacent to each other in the rotated binary image into one group by labeling and extracts a rectangle circumscribed about a connection region having connected black pixels in the rotated binary image as a character region. The region detection module 222 puts character regions placed within a predetermined distance each other in a predetermined direction (e.g., the horizontal direction) and spaced apart from each other in a direction (e.g., the vertical direction) perpendicular to the predetermined direction into groups corresponding to character strings. The region detection module 222 detects a rectangle circumscribed about each group as a character recognition target region candidate. The region detection module 222 then detects a character recognition target region candidate placed on the lowermost side and a character recognition target region candidate placed on the second lowermost side as character recognition target regions.

In steps S207 to S210, the region detection module 222 may detect a character recognition target region, based on a feature in the image, instead of detecting a character recognition target region, based on the position of the region stored in the second storage device 210. In this case, information such as the width or the height of a character recognition target region, or the row count or the distance between individual rows (inter-row distance) in the character recognition target region is set in the second storage device 210 as a feature in the image. The region detection module 222 puts black pixels adjacent to each other in the binary image into one group by labeling, combines groups placed within a predetermined distance, and detects the combined group as a character recognition target region candidate.

The region detection module 222 specifies a width, a height, a row count, and/or an inter-row distance, for each detected character recognition target region candidate, and detects a character recognition target region, based on the degree of matching between each type of specified information and the corresponding type of information set in the second storage device 210. The region detection module 222 calculates the degree of matching to be higher for the smaller difference between each type of specified information and the corresponding type of information set in the second storage device 210, and detects a predetermined number of character recognition target region candidates as character recognition target regions in descending order of degree of matching. The region detection module 222 may calculate the degree of matching with information-specific variations in weight. For specific information (e.g., the row count), when the specified information does not match the information set in the second storage device 210, the region detection module 222 may even detect no character recognition target region.

In step S211, in the corrected image, the corrected image generation module 223 may place a region corresponding to the character recognition target region at the position of another region, instead of placing the region at the position of an MRZ in a captured image of a passport. For example, in the corrected image, the corrected image generation module 223 may place a region corresponding to the character recognition target region at the position of, e.g., an insurance identification number or a name in a captured image of a health insurance card. In the corrected image, the corrected image generation module 223 may even place a region corresponding to the character recognition target region at the position of, e.g., a number or a name in a captured image of a driver's license. In the corrected image, the corrected image generation module 223 may even place a region corresponding to the character recognition target region at the position of, e.g., an account number, a routing number, or a name in a captured image of a passbook.

In the corrected image, the corrected image generation module 223 may even place a region corresponding to the character recognition target region in a region within an image specified by a user, instead of the position of a region within an image specified by a predetermined organization. In this case, a position which allows satisfactory detection of characters by general OCR software is set in the second storage device 210 as the position of a predetermined region in an image conforming to a predetermined format. For example, the predetermined region is set to extend in the horizontal or vertical direction within the image. When a plurality of predetermined regions are set, each predetermined region is set to include a sufficient margin between individual predetermined regions.

In these cases, the position of each region to be placed by the corrected image generation module 223 is set in the second storage device 210 as the position of a predetermined region in an image conforming to a predetermined format. In steps S207 to S210, the region detection module 222 detects a region corresponding to the region set in the second storage device 210 from the input image as a character recognition target region.

As described in detail above, by operation in accordance with the flowchart illustrated in FIG. 5, the information processing apparatus 200 generates a corrected image by placing a character recognition target region in the input image at the position of a predetermined region in an image conforming to a predetermined format and detects characters from the corrected image. In the corrected image, a character recognition target region is placed at an appropriate position conforming to the predetermined format, and contents other than the character recognition target region are not placed. Therefore, the information processing apparatus 200 can more accurately detect characters from the input image.

Further, the information processing apparatus 200 generates a corrected image by placing a character recognition target region at a position suitable for general OCR processing. Therefore, the information processing apparatus 200 can satisfactorily detect characters using general-purpose OCR software, without using OCR software specialized to detect characters from an image conforming to a predetermined format.

Especially when the document is a passport, the detailed specifications of the passport vary in each country. For example, in the passport of France, since the distance between the upper region and the lower region of MRZs is small, and the upper region is adjacent to the lower region in an input image, characters in the MRZs are less likely to be satisfactorily detected. In the passport of, e.g., Germany, since MRZs are contained in independent pages, and no character recognition target region is present at an expected position in an input image, characters in the MRZs are less likely to be satisfactorily detected. The information processing apparatus 200 can satisfactorily detect characters in MRZs from passports having various specifications by detecting characters from a corrected image having a character recognition target region in an image placed at an appropriate position.

Figure 12:
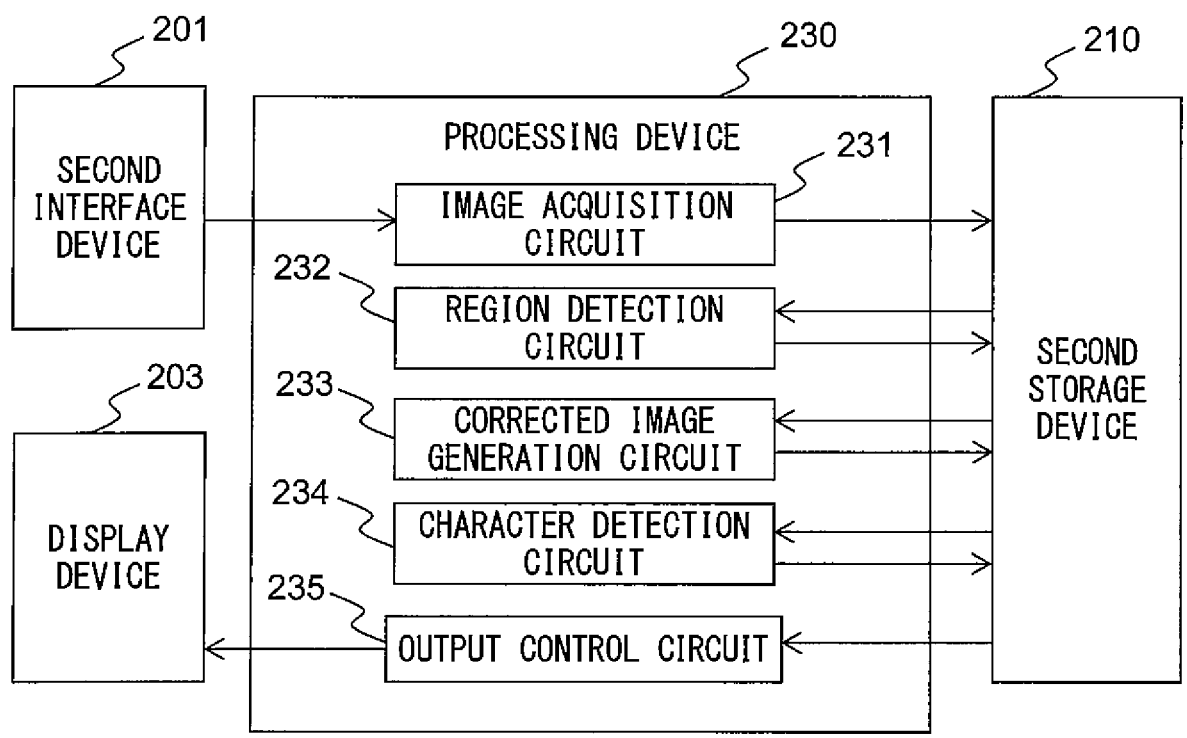
FIG. 12 is a block diagram illustrating the schematic configuration of a processing device 230.

FIG. 12 is a block diagram illustrating the schematic configuration of a processing device 230 in an information processing apparatus according to another embodiment.

The processing device 230 performs detection processing, in place of the CPU 220. The processing device 230 includes, e.g., an image acquisition circuit 231, a region detection circuit 232, a corrected image generation circuit 233, a character detection circuit 234, and an output control circuit 235.

The image acquisition circuit 231 is an example of an image acquisition module and has the same function as the image acquisition module 221. The image acquisition circuit 231 acquires a read image from the image reading apparatus 100 via the second interface device 201, generates an input image from the read image, and stores it in the second storage device 210.

The region detection circuit 232 is an example of a region detection module and has the same function as the region detection module 222. The region detection circuit 232 reads the input image from the second storage device 210, detects a character recognition target region from the input image, and stores the detection result in the second storage device 210.

The corrected image generation circuit 233 is an example of a corrected image generation module and has the same function as the corrected image generation module 223. The corrected image generation circuit 233 reads the input image from the second storage device 210 or an image generated from the input image, the detection result of a character recognition target region, and the position of a predetermined region in an image conforming to a predetermined format, generates a corrected image, and stores it in the second storage device 210.

The character detection circuit 234 is an example of a character detection module and has the same function as the character detection module 224. The character detection circuit 234 reads the corrected image from the second storage device 210, detects characters from the corrected image, and stores the detection result in the second storage device 210.

The output control circuit 235 is an example of an output control module and has the same function as the output control module 225. The output control circuit 235 reads the detection result of the characters from the second storage device 210 and outputs it to the display device 203.

As described in detail above, the information processing apparatus can more accurately detect characters from an input image even when the processing device 230 is used.

While preferred embodiments have been described above, it is not limited to the embodiments. For example, sharing of functions between an image reading apparatus 100 and an information processing apparatus 200 is not limited to the examples of the image processing system 1 illustrated in FIG. 1; the components of the image reading apparatus 100 and the information processing apparatus 200 can be provided any of the image reading apparatus 100 and the information processing device 200 as appropriate. Alternatively, the image reading apparatus 100 and the information processing apparatus 200 may be configured as a single apparatus.

For example, the first storage device 110 of the image reading apparatus 100 may store each program stored in the second storage device 210 of the information processing apparatus 200, and the first CPU 120 of the image reading apparatus 100 may operate as each module implemented by the second CPU 220 of the information processing apparatus 200. The image reading apparatus 100 may even include a processing device similar to the processing device 230 of the information processing apparatus 200.

In this case, the image reading apparatus 100 includes a display device similar to the display device 203. Since detection processing is performed by the image reading apparatus 100, processing of transmitting and receiving a read image in steps S102 and S201 is omitted. The respective processes in steps S202 to S213 are executed by the first CPU 120 or the processing device of the image reading apparatus 100. These processing operations are similar to those executed by the second CPU 220 or the processing device 230 of the information processing apparatus 200.

Furthermore, the first interface device 101 and the second interface device 201 in the image processing system 1 may be interconnected through a network such as the Internet, a telephone network (including a mobile network and a fixed-telephone network) or an intranet. In that case, each of the first interface device 101 and the second interface device 201 is equipped with an interface circuit for connecting to the network. Additionally, in that case, a plurality of information processing apparatuses may be distributed on the network and the information processing apparatuses may cooperate with one another to perform the rectangle region detection processing and other processing in a distributed manner, so that image processing services can be provided in the form of cloud computing. This enables the document rectangle region detection processing to be efficiently performed by the image processing system 1 for read images read by a plurality of image reading apparatuses.

According to this embodiment, the image processing apparatus, the control method, and the control program can more accurately detect characters from an input image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   a storage device to store, in advance, positions of a plurality of predetermined machine readable zones (MRZs) in an image of a document having a predetermined format;
   a processor to
      acquire an input image of a document including a plurality of character recognition target regions, respectively corresponding to the plurality of stored predetermined MRZs and the predetermined format of the document,
      generate a rotated binary image by binarizing a rotated image acquired by rotating the input image,
      calculate a black pixel count on each of a plurality of lines extending in a predetermined direction in the rotated binary image, for each line extending in the predetermined direction,
      detect the character recognition target region, based on the black pixel count calculated for each of the plurality of lines,
      cut out a plurality of regions respectively corresponding to the plurality of character recognition target regions from the input image or an image generated from the input image,
      place the cut out plurality of regions at positions that are respectively corresponding to the stored positions of the plurality of predetermined MRZs corresponding to the predetermined format of the document,
      generate a corrected image in which the cut out plurality of regions are placed at the positions respectively corresponding to stored positions, and
      detect a character from the corrected image; and
   an output device to output information related to the detected, wherein the processor.

2. The image processing apparatus according to claim 1, wherein the processor detects a tilt of the document included in the input image, and generates the rotated image, based on the detected tilt.

3. The image processing apparatus according to claim 1, wherein the processor
calculates a black pixel count on each of a plurality of lines extending in a direction perpendicular to the predetermined direction in the rotated binary image, for each line extending in the direction perpendicular to the predetermined direction, and
detects the plurality of character recognition target regions, based on the black pixel count calculated for each of the plurality of lines extending in the direction perpendicular to the predetermined direction.

4. The image processing apparatus according to claim 1, wherein the processor enlarges or reduces the plurality of character recognition target regions to place the plurality of character recognition target regions at the positions of the plurality of predetermined MRZs in the corrected image.

5. A control method for an image processing apparatus including a storage device and an output device, the method comprising:
storing, in the storage device, in advance positions of a plurality of predetermined machine readable zones (MRZs) in an image of a document having a predetermined format;
acquiring an input image of a document including a plurality of character recognition target regions, respectively corresponding to the plurality of stored predetermined MRZs and the predetermined format of the document;
generating a rotated binary image by binarizing a rotated image acquired by rotating the input image;
calculating a black pixel count on each of a plurality of lines extending in a predetermined direction in the rotated binary image, for each line extending in the predetermined direction;
detecting the character recognition target region, based on the black pixel count calculated for each of the plurality of lines;
cutting out a plurality of regions respectively corresponding to the plurality of character recognition target regions from the input image or an image generated from the input image;
placing the cut out plurality of regions at positions that are respectively corresponding to the stored positions of the plurality of predetermined MRZs corresponding to the predetermined format of the document;
generating a corrected image in which the cut out plurality of regions are placed at the positions respectively corresponding to stored positions;
detecting a character from the corrected image; and
outputting information related to the detected character from the output device.

6. A computer-readable, non-transitory medium storing a computer program, wherein the computer program causes an image processing apparatus including a storage device and an output device, to execute a process, the process comprising:
storing, in the storage device, in advance positions of a plurality of predetermined machine readable zones (MRZs) in an image of a document having a predetermined format;
acquiring an input image of a document including a plurality of character recognition target regions, respectively corresponding to the plurality of stored predetermined MRZs and the predetermined format of the document;
generating a rotated binary image by binarizing a rotated image acquired by rotating the input image;
calculating a black pixel count on each of a plurality of lines extending in a predetermined direction in the rotated binary image, for each line extending in the predetermined direction;
detecting the character recognition target region, based on the black pixel count calculated for each of the plurality of lines;
cutting out a plurality of regions respectively corresponding to the plurality of character recognition target regions from the input image or an image generated from the input image;
placing the cut out plurality of regions at positions that are respectively corresponding to the stored positions of the plurality of predetermined MRZs corresponding to the predetermined format of the document;
generating a corrected image in which the cut out plurality of regions are placed at the positions respectively corresponding to stored positions;
detecting a character from the corrected image; and
outputting information related to the detected character from the output device.

* * * * *

UNITED STATES PATENT AND TRADEMARK OFFICE
CERTIFICATE OF CORRECTION

PATENT NO.           : 10,970,579 B2                                          Page 1 of 1
APPLICATION NO.      : 16/424282
DATED                : April 6, 2021
INVENTOR(S)          : Keiji Ohara et al.

It is certified that error appears in the above-identified patent and that said Letters Patent is hereby corrected as shown below:

In the Claims
Column 20, Line 63, Claim 1        Delete ", wherein the processor"

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*